(12) United States Patent
Baldwin

(10) Patent No.: US 10,312,672 B2
(45) Date of Patent: Jun. 4, 2019

(54) CORNER CABLE CONDUIT

(71) Applicant: Jeffrey Baldwin, Anthem, AZ (US)

(72) Inventor: Jeffrey Baldwin, Anthem, AZ (US)

( * ) Notice: Subject to any disclaimer, the term of this patent is extended or adjusted under 35 U.S.C. 154(b) by 0 days.

(21) Appl. No.: 15/961,195

(22) Filed: Apr. 24, 2018

(65) Prior Publication Data

US 2018/0269666 A1 Sep. 20, 2018

Related U.S. Application Data

(63) Continuation-in-part of application No. 29/567,738, filed on Jun. 12, 2016, now Pat. No. Des. 822,614.

(51) Int. Cl.
| | | |
|---|---|---|
| *H02G 3/04* | (2006.01) | |
| *F16L 3/12* | (2006.01) | |
| *H02G 3/06* | (2006.01) | |

(52) U.S. Cl.
CPC .......... *H02G 3/0431* (2013.01); *F16L 3/1226* (2013.01); *H02G 3/0425* (2013.01); *H02G 3/0608* (2013.01)

(58) Field of Classification Search
CPC .............................. H02G 3/0431; F16L 3/1226
USPC ........................................ 174/492, 480, 481
See application file for complete search history.

(56) References Cited

U.S. PATENT DOCUMENTS

| | | | |
|---|---|---|---|
| 1,182,872 A | 5/1916 | Darrow | |
| 4,563,542 A | 1/1986 | Pollack | |
| RE32,820 E | 1/1989 | Pollack | |
| 5,016,924 A | 5/1991 | Lin | |
| 5,091,607 A * | 2/1992 | Stob ...................... | H02G 3/288 |
| | | | 174/492 |
| 5,753,855 A | 5/1998 | Nicoli | |
| 6,049,040 A * | 4/2000 | Biles .................... | H02G 3/0487 |
| | | | 174/101 |
| D447,737 S | 9/2001 | Scherer | |
| D541,143 S | 4/2007 | Ruddick | |
| 7,696,434 B2 | 4/2010 | Ruddick | |
| D719,527 S | 12/2014 | Kim | |
| D729,177 S | 5/2015 | Baldwin | |
| D756,307 S | 5/2016 | Ruddick | |
| 9,455,556 B1 | 9/2016 | Baldwin | |
| 2002/0141723 A1 | 10/2002 | Kent | |
| 2008/0149362 A1 | 6/2008 | Ruddick | |

* cited by examiner

*Primary Examiner* — Dhiru R Patel
(74) *Attorney, Agent, or Firm* — Booth Udall Fuller, PLC

(57) ABSTRACT

A cable conduit system including a curved conduit having a first end and a second end with the first end being perpendicular to the second end, and an inner curved surface opposite an outer curved Surface, wherein the inner curved surface and the outer curved surface define a space for receiving a plurality of cables, and wherein the inner curved surface is oriented to abut a mounting surface and is complimentary shaped to the mounting surface.

20 Claims, 6 Drawing Sheets

CORNER CABLE CONDUIT

CROSS-REFERENCE TO RELATED APPLICATIONS

This application is a continuation-in-part of currently pending U.S. Design patent application Ser. No. 29/567,738 to Baldwin, filed on Jun. 12, 2016.

BACKGROUND

1. Technical Field

Aspects of the present disclosure relate generally to cable management and aesthetically pleasing structure to protect and cover electrical cables.

2. Background Art

Cable management systems are well known in the art, but fail at properly protecting and securing cables in certain situations. Some modern architecture utilizes non-linear surfaces which tend to create gaps between the cable management system and the mounting system.

SUMMARY

Aspects of this disclosure relate to a curved cable system. In one aspect, a cable conduit system includes a curved conduit having a first end and a second end with the first end being perpendicular to the second end, and an inner curved surface opposite an outer curved surface, wherein the inner curved surface and the outer curved surface define a space for receiving a plurality of cables, and wherein the inner curved surface is oriented to abut a mounting surface and is complimentary shaped to the mounting surface.

In an implementation, the inner curved surface and the outer curved surface may be colinear. The inner curved surface and the outer curved surface may be parallel to each other. The inner curved surface may be not visible after installation on a wall. The cable conduit system may further include at least one engagement feature on the first end for connecting the curved conduit to a second cable conduit. The cable conduit system may further include at least one engagement feature on the second end for connecting the curved conduit to a third cable conduit. The second cable conduit is a straight cable conduit. The at least one engagement feature secures the second cable conduit within a first end of the curved conduit.

The curved conduit may further include a bottom surface oriented to contact a floor surface. The curved conduit first end may be complimentary shaped to the second cable conduit. The complimentary shape may be the cross-sectional shape of the curved conduit first end and the second cable conduit. The curved cable conduit cross-sectional shape may be generally U-shaped. The curved cable conduit may be composed of a plastic material. The curved cable conduit may be composed of a metal material. The mounting surface may be a wall. The mounting surface may be a baseboard.

In another aspect, a method of protecting cables oriented around a non-linear wall surface includes the steps of positioning a first cable conduit on a first wall surface, positioning a second cable conduit on a second wall surface wherein the first and second wall surfaces are non co-linear, routing a plurality of cables though the first and second cable conduits, enclosing the plurality of cables within the first and second cable conduits, orienting a curved cable conduit over the plurality of cables where the first and second walls surfaces are non co-linear, engaging the curved cable conduit with the first cable conduit and the second cable conduit such that the curved cable conduit positions the plurality of cables between an interior surface of the curved cable conduit and the non co-linear surfaces of the first and second walls.

Another implementation may include the step of engaging the curved cable conduit with the first cable conduit and the second cable conduit with an engagement feature of the curved cable conduit. The step of orienting the curved cable conduit may include positioning an inner surface of the curved cable conduit in contact with the non co-linear portion of the first and second walls. The curved cable conduit may be oriented to contact the non co-linear portion of the first and second walls as well as a floor surface.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Embodiments of the present invention will hereinafter be described in conjunction with the appended drawings, where like designations denote like elements, and.

DETAILED DESCRIPTION

Figure 1:
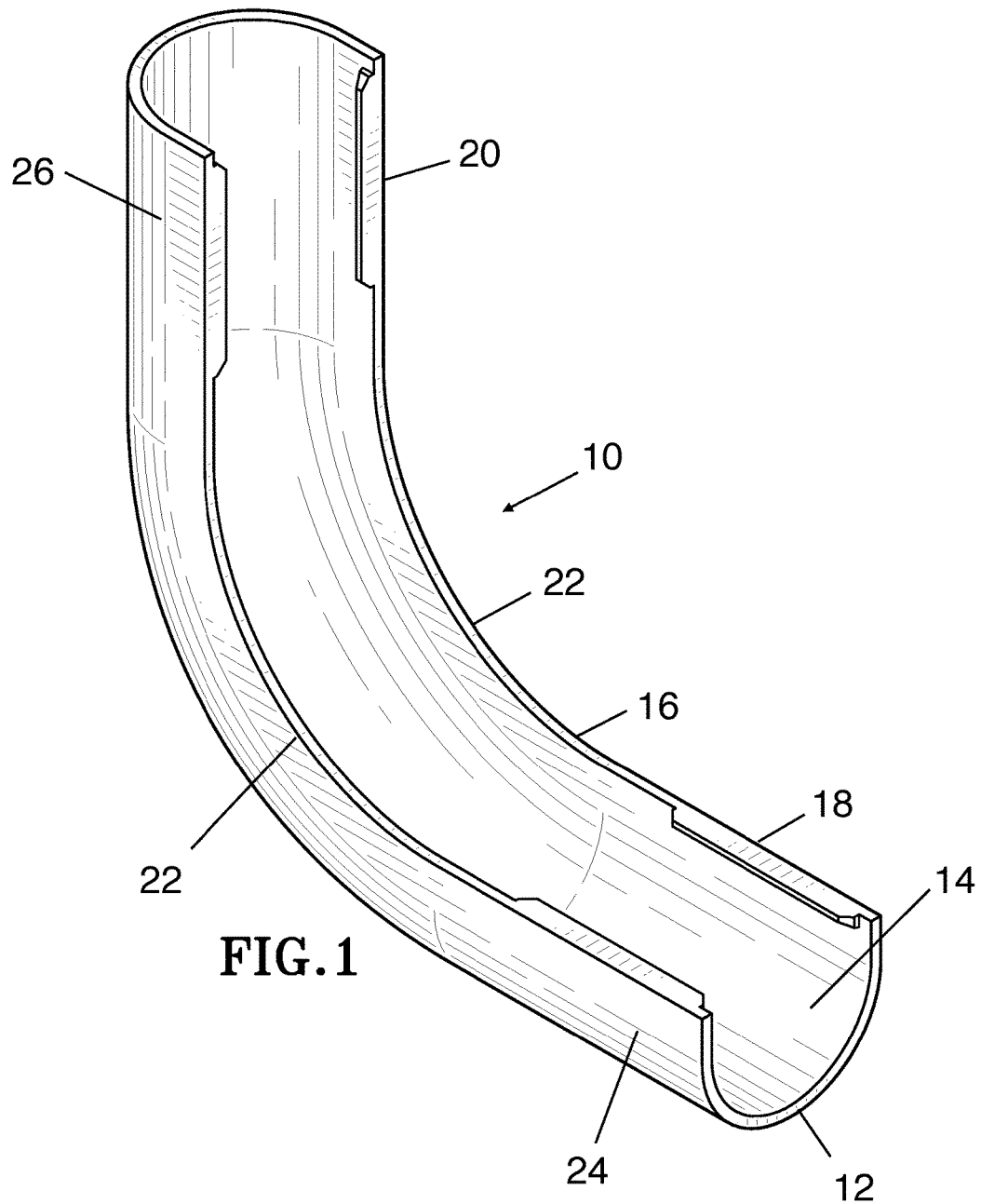
FIG. 1 is a perspective view of a cable system curved conduit.
Figure 2:
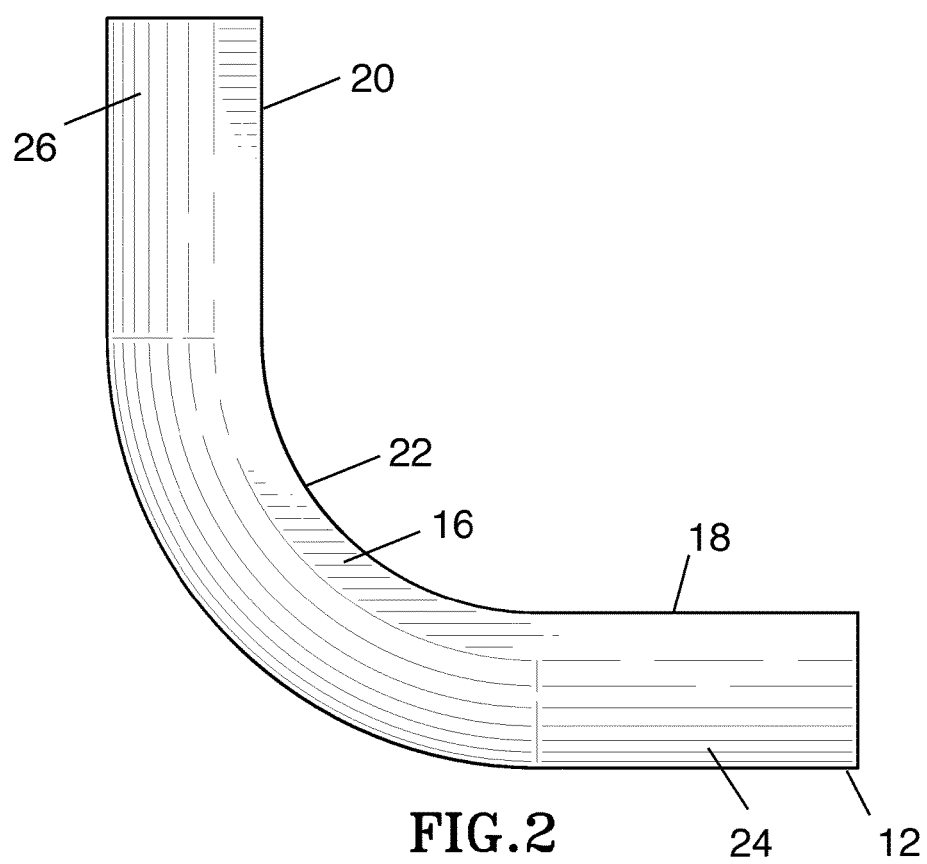
FIG. 2 is a left side elevation view of the cable system curved conduit.
Figure 3:
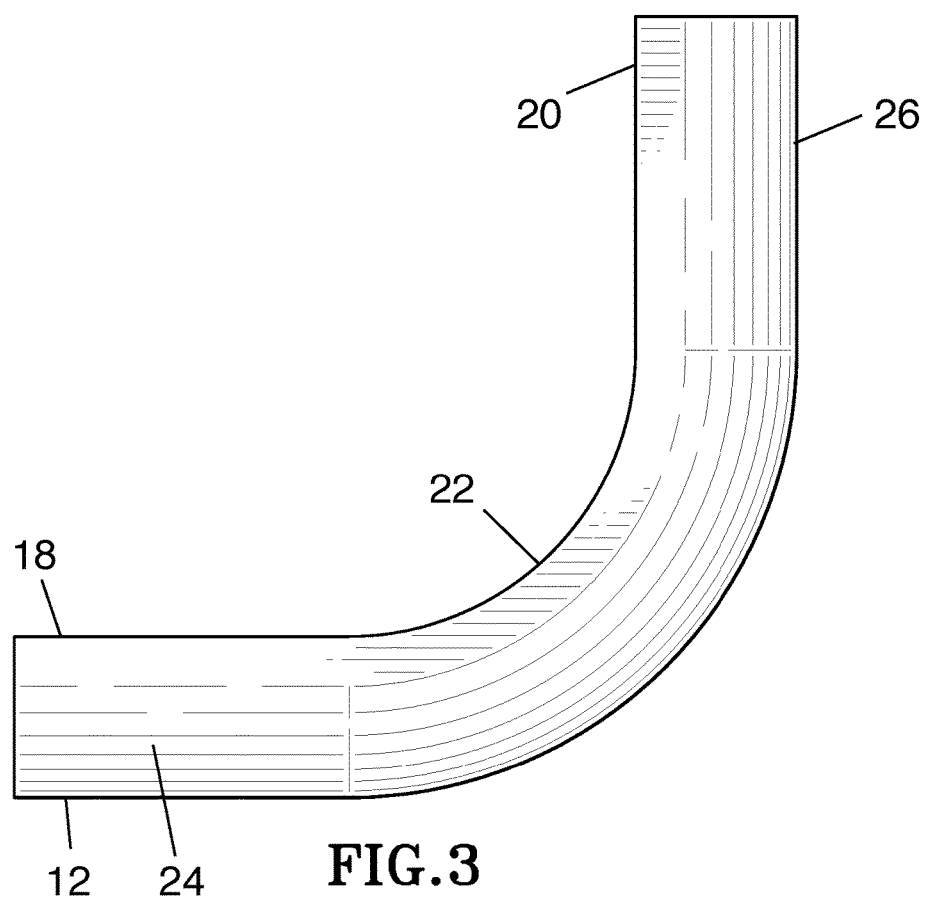
FIG. 3 is a right side elevation view of the cable system curved conduit.
Figure 4:
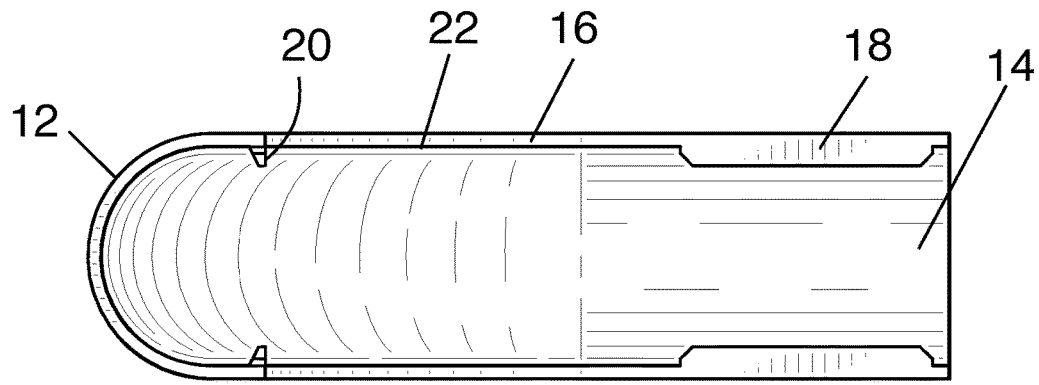
FIG. 4 is a top plan view of the cable system curved conduit.
Figure 5:
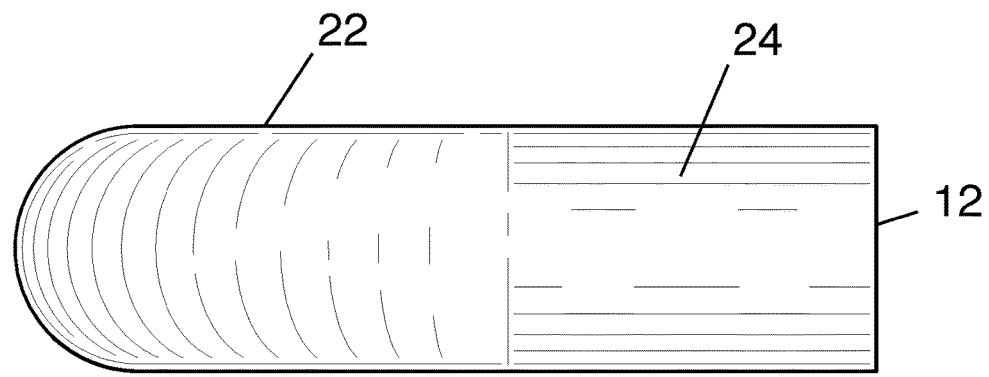
FIG. 5 is a bottom plan view of the cable system curved conduit.
Figure 6:
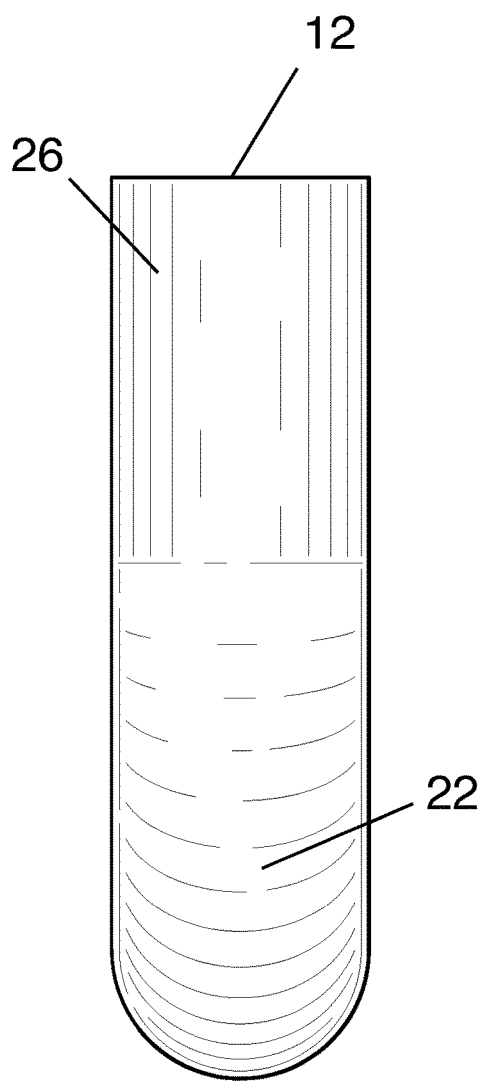
FIG. 6 is a rear elevation view of the cable system curved conduit.
Figure 7:
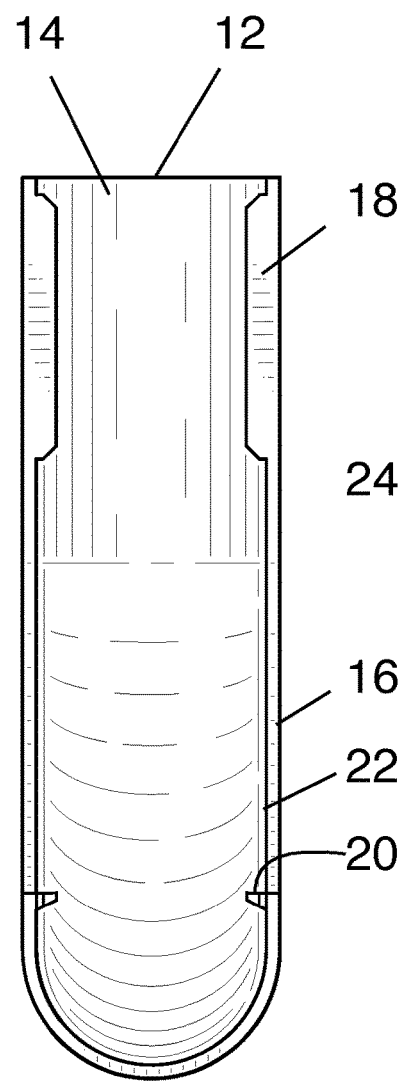
FIG. 7 is a front elevation view of the cable system curved conduit.

This disclosure, its aspects and implementations, are not limited to the specific components or assembly procedures disclosed herein. Many additional components and assembly procedures known in the art consistent with the intended operation and assembly procedures for a cable conduit system will become apparent for use with implementations of a cable conduit system from this disclosure. Accordingly, for example, although particular components are disclosed, such components and other implementing components may comprise any shape, size, style, type, model, version, measurement, concentration, material, quantity, and/or the like as is known in the art for such implementing components, consistent with the intended operation of a cable conduit system.

FIGS. 1 through 7 illustrate enlarged views of a curved conduit 10 having a first 12 and a second end 26, with the first end 12 and the second end 26 being generally perpendicular to each other. The curved conduit includes an inner surface 14 and an outer surface 24. Positioned between the first end 12 and the second end 26 is a middle portion 16 having an inner curved surface 22. Inner curved surface 22 is preferably structured to directly contact a mounting surface wall along a non-liner portion of the wall, thereby ensure an enclosed region defined by them inner surface 14, the first end 10, the second end 26, and the middle portion 16. This structure allows an electrical cable to be positioned within the enclosed region while the curved cable conduit is complimentary shaped to the wall mounting surface. While the curved conduit 10 is shown as being generally U-shaped, it is within the spirit and scope of the disclosure to structure the curved conduit as any number of shapes, including by example only, square or rectangular. Notably, the cross-sectional shape of the curved conduit 10 is influenced by the cross-sectional shape of adjacent cable conduits which are typically straight.

Still further, the curved conduit 10 includes an engagement feature 18 on first end 12 and an engagement feature 20 on second end 26. Engagement features 18 and 20 function to securely connect the curved conduit 10 to adjacent cable conduits. Specifically, the engagement features 18 and 20 may be oriented to fit around adjacent cable conduits so that the curved conduit 10 is removably secured to the cable conduits and forms a continuous path through the adjacent cable conduits and the enclosed region formed by the first end 12, the second end 26, middle portion 16, and the mounting surface. As can be seen in FIG. 1, the curved conduit 10 is structured so that the inner surface 14 and outer surface 24 are colinear in one aspect and may also be parallel to each other in another aspect. When installed on the mounting surface, the inner curved surface 14 is preferably not visible and in direct contact with the mounting surface, although slight variations in the mounting surface may prevent this contact.

Figure 8:
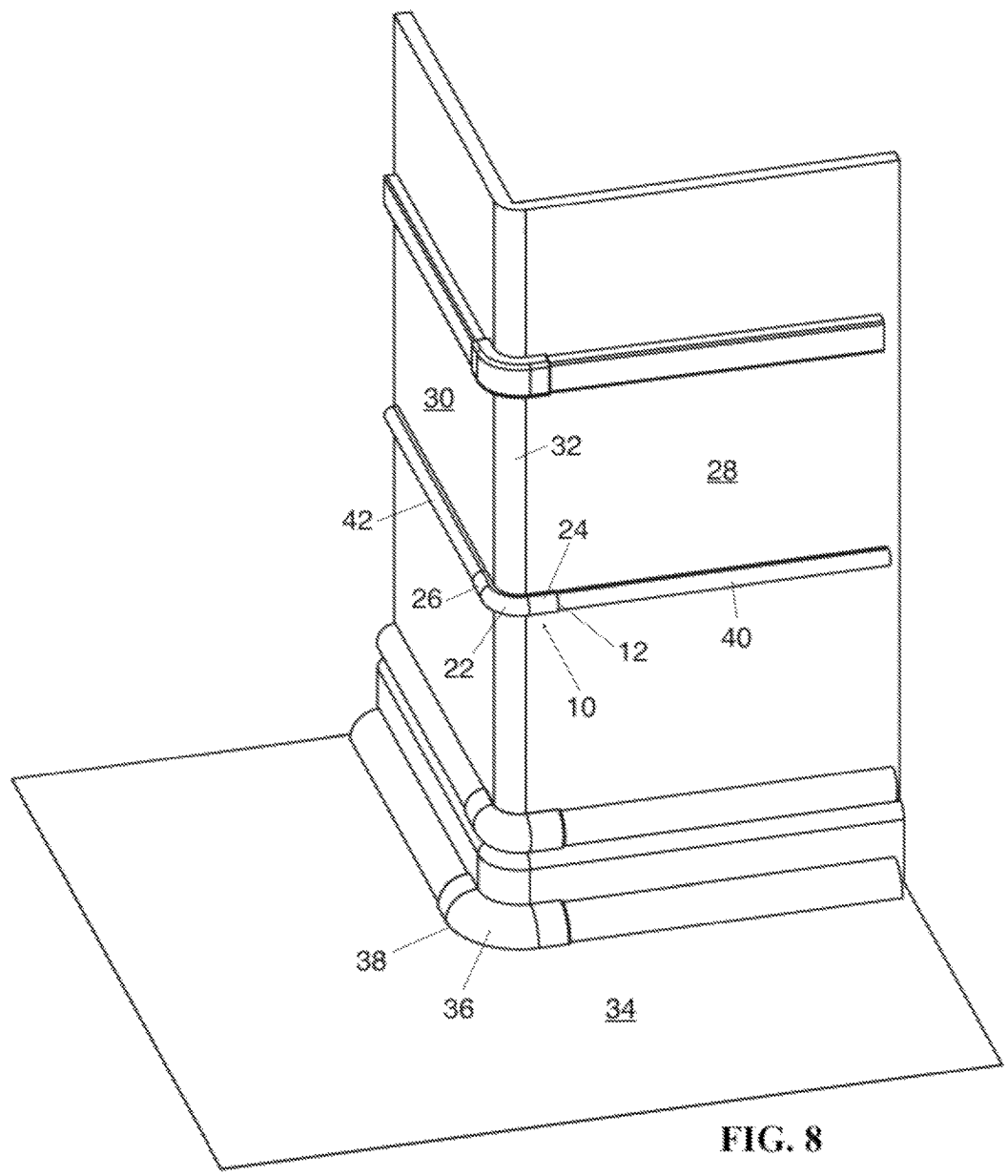
FIG. 8 is a perspective view of several cable systems with curved conduits mounted on a wall.

Moving to FIG. 8, a plurality of cable conduits are disclosed and illustrate exemplary conduit shape and orientations. Curved conduit 10 is shown secured to cable conduits 40 and 42 while secured on a mounting surface 28, which is a wall in this illustration. Mounting surface 28 is also connected to another mounting surface 30 at a non-linear section 32. The non-linear section 32 may be rounded to me more aesthetically pleasing. In this structure, a traditional curved conduit 10 would leave a gap between the non-linear section 32 and the curved conduit 10.

Still further, another implementation curved conduit 36 is shown at a bottom surface connected to adjacent cable conduits and abutting both a floor 34 and a baseboard (not labeled). In particular, a bottom surface 38 of curved conduit 36 contact floor 34 to seal of the curved conduit and form an enclosed region to receive electrical cables therein. Functionally, the curved conduit 36 is similar to curved conduit 10 but is oriented adjacent both a wall or baseboard and the floor 34.

Curve conduits 10 and 36 may be composed of a plastic material, a metal material, or any other suitable material. One main factor is the material used to form the adjacent cable conduit components.

Installation of the curved conduit 10 includes first mounting cable conduits 40 and 42 to their respective walls, routing electrical cables though the mounted cable conduits, enclosing or closing the cable conduits 40 and 42, and then orienting curved cable conduit 10 so that engagement features 18 and 20 contact the cable conduits 40 and 42, to hold the curved conduit in contact with the cable conduits 40 and 42. In this structure, inner curved surface 22 abuts the mounting wall at the non-linear or curved portion to securely enclose a full path for cables. The installation of curved conduit 36 is identical to curved conduit 10 except that the curved conduit will contact with a wall or baseboard and a floor.

It will be understood that implementations are not limited to the specific components disclosed herein, as virtually any components consistent with the intended operation of a method and/or system implementation for a cable conduit system may be utilized. Components may comprise any shape, size, style, type, model, version, class, grade, measurement, concentration, material, weight, quantity, and/or the like consistent with the intended operation of a method and/or system implementation for a cable conduit system.

The concepts disclosed herein are not limited to the specific implementations shown herein. For example, it is specifically contemplated that the components included in a particular implementation of a cable conduit system may be formed of any of many different types of materials or combinations that can readily be formed into shaped objects and that are consistent with the intended operation of a cable conduit system. For example, the components may be formed of: rubbers (synthetic and/or natural) and/or other like materials; polymers and/or other like materials; plastics, and/or other like materials; composites and/or other like materials; metals and/or other like materials; alloys and/or other like materials; and/or any combination of the foregoing.

Furthermore, embodiments of the cable conduit system may be manufactured separately and then assembled together, or any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled or removably coupled with one another in any manner, such as with adhesive, a weld, a fastener, any combination thereof, and/or the like for example, depending on, among other considerations, the particular material(s) forming the components.

In places where the description above refers to particular implementations of a cable conduit system, it should be readily apparent that a number of modifications may be made without departing from the spirit thereof and that these implementations may be applied to other cable conduit systems. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

I claim:

1. A cable conduit system for enclosing conduit mounted on an external surface of a wall, the system comprising:
   a curved conduit having a first end and a second end with the first end of the conduit being oriented perpendicular to an orientation of the second end of the conduit, the conduit defining a continuous open path from the first end to the second end and comprising first and second edges parallel to each other on opposing sides of the conduit, the first and second edges extending from the first end to the second end, the conduit further comprising a first engagement feature on the first edge of the first end and a second engagement feature on the second edge of the first end, the first and second engagement features extending toward each other over the open channel from the opposing sides of the conduit, and an inner curved surface opposite an outer curved surface;
   wherein the conduit is sized and configured to receive a plurality of cables through the curved conduit between the sides of the conduit; and
   wherein the first and second engagement features are oriented to abut a mounting surface on a first wall and the second end is oriented to abut a mounting surface on a second wall non-colinear with the first wall.

2. The cable conduit system of claim 1 wherein the inner curved surface and the outer curved surface are colinear.

3. The cable conduit system of claim 1 wherein the inner curved surface and the outer curved surface are parallel to each other.

4. The cable conduit system of claim 1 wherein the inner curved surface is not visible after installation on a wall.

5. The cable conduit system of claim 1 further comprising at least one engagement feature on the second end for connecting the curved conduit to a third cable conduit.

6. The cable conduit system of claim 1 wherein the second cable conduit is a straight cable conduit.

7. The cable conduit system of claim 1 wherein the at least one engagement feature secures the second cable conduit within a first end of the curved conduit.

8. The cable conduit system of claim 1 wherein the curved conduit further comprises bottom surface oriented to contact a floor surface.

9. The cable conduit system of claim 1 wherein the curved conduit first end is complimentary shaped to the second cable conduit.

10. The cable conduit system of claim 9 wherein the complimentary shape is the cross-sectional shape of the curved conduit first end and the second cable conduit.

11. The cable conduit system of claim 1 wherein the curved cable conduit cross-sectional shape is generally U-shaped.

12. The cable conduit system of claim 1 wherein the curved cable conduit is composed of a plastic material.

13. The cable conduit system of claim 1 wherein the curved cable conduit is composed of a metal material.

14. The cable conduit system of claim 1 wherein the mounting surface is a wall.

15. The cable conduit system of claim 1 wherein the mounting surface is a baseboard.

16. A method of protecting cables oriented around a non-linear wall surface, the method comprising:
   positioning a first cable conduit on a first wall surface;
   positioning a second cable conduit on a second wall surface wherein the first and second wall surfaces are non co-linear;
   routing a plurality of cables though the first and second cable conduits;
   enclosing the plurality of cables within the first and second cable conduits;
   providing a curved cable conduit defining an open path from first end to a second end of the conduit and comprising first and second edges parallel to each other on opposing sides of the conduit, the first and second edges extending from the first end to the second end, the conduit further comprising a first engagement feature on the first edge of the first end and a second engagement feature on the second edge of the first end, the first and second engagement features extending toward each other over the open path from the opposing sides of the conduit;
   orienting the curved cable conduit over the plurality of cables at a part of the cables where the first and second walls surfaces are non-colinear, and the first and second edges are each in contact with both of the non-colinear first and second wall surfaces and the plurality of cables are enclosed within the conduit between the opposing sides of the conduit;
   engaging the curved cable conduit with the first cable conduit and the second cable conduit such that the curved cable conduit positions the plurality of cables between an interior surface of the curved cable conduit and the non co-linear surfaces of the first and second walls.

17. The method of claim 16 further comprising engaging the curved cable conduit with the first cable conduit with the first and second engagement features of the curved cable conduit.

18. The method of claim 16 wherein orienting the curved cable conduit includes positioning the first and second engagement features of the curved cable conduit in contact with the first wall surface.

19. The method of claim 16 further comprising placing the curved cable conduit in contact with the non-colinear portions of the first and second walls and a floor surface.

20. A cable conduit system for enclosing conduit mounted on an external surface of a wall, the system comprising:
   a curved conduit having a first end and a second end with the first end of the conduit being oriented perpendicular to an orientation of the second end of the conduit, the conduit defining a continuous open path from the first end to the second end and comprising first and second edges parallel to each other on opposing sides of the conduit, the first and second edges extending from the first end to the second end, the conduit further comprising an engagement feature on the first edge of the first end extending over the open path toward the second edge of the first end;

wherein the conduit is sized and configured to receive a plurality of cables through the curved conduit between the sides of the conduit; and wherein the first and second edges are oriented to both abut a first wall surface on a first wall and a second wall surface on a second wall, the first wall surface being non-colinear with the second wall surface.

\* \* \* \* \*